US008565383B2

(12) United States Patent
Allen

(10) Patent No.: US 8,565,383 B2
(45) Date of Patent: Oct. 22, 2013

(54) EMERGENCY NUMBER INTEGRATED INFORMATION ASSIMILATION DEVICE

(76) Inventor: Kris Allen, Watertown, NY (US)

( * ) Notice: Subject to any disclaimer, the term of this patent is extended or adjusted under 35 U.S.C. 154(b) by 0 days.

(21) Appl. No.: 13/482,357

(22) Filed: May 29, 2012

(65) Prior Publication Data
US 2012/0237003 A1    Sep. 20, 2012

Related U.S. Application Data

(63) Continuation of application No. 11/744,770, filed on May 4, 2007, now abandoned.

(51) Int. Cl.
*H04M 11/04* (2006.01)
(52) U.S. Cl.
USPC .......................................... 379/45; 455/404.1
(58) Field of Classification Search
USPC ...................................................... 379/37–52
See application file for complete search history.

(56) References Cited

U.S. PATENT DOCUMENTS

| 5,161,180 | A | 11/1992 | Chavous |
| 5,339,351 | A | 8/1994 | Hoskinson et al. |
| 5,479,482 | A | 12/1995 | Grimes |
| 5,646,987 | A | 7/1997 | Gerber et al. |
| 5,671,408 | A * | 9/1997 | McBride .................. 379/112.06 |
| 5,805,670 | A | 9/1998 | Pons et al. |
| 6,104,784 | A * | 8/2000 | Robbins .......................... 379/45 |
| 6,363,138 | B1 | 3/2002 | Aprile |
| 6,415,019 | B1 | 7/2002 | Savaglio et al. |
| 6,731,721 | B2 | 5/2004 | Tanaka et al. |
| 6,775,356 | B2 | 8/2004 | Salvucci |
| 6,950,499 | B2 | 9/2005 | Savaglio et al. |
| 7,127,044 | B1 | 10/2006 | Becker et al. |
| 2004/0102178 | A1* | 5/2004 | Williams ................... 455/404.1 |
| 2005/0053209 | A1* | 3/2005 | D'Evelyn et al. ............. 379/111 |
| 2008/0273669 | A1 | 11/2008 | Allen |

* cited by examiner

*Primary Examiner* — Curtis Kuntz
*Assistant Examiner* — Maria El-Zoobi
(74) *Attorney, Agent, or Firm* — Peter J. Mikesell; Hiscock & Barclay, LLP

(57) ABSTRACT

An information transponding device in communication with an emergency number answering point, an ALI database and a remote storage device. The information transponding device receives ANI information from the emergency number answering point and accesses corresponding information in the ALI database and the remote storage device and assimilates the information into a readable format utilized at the emergency number answering point and transmits to the readable format to the emergency number answering point. The detailed information is updated and modified by authorized users via a secure Web portal on the World Wide Web. An automatic notification device automatically informs predetermined contacts that an emergency number was dialed from a particular line.

15 Claims, 5 Drawing Sheets

US 8,565,383 B2

EMERGENCY NUMBER INTEGRATED INFORMATION ASSIMILATION DEVICE

CROSS-REFERENCE TO RELATED APPLICATION

This application is a continuation of co-pending U.S. patent application Ser. No. 11/744,770, filed May 4, 2007, which application is incorporated herein by reference in its entirety.

FIELD OF THE INVENTION

This invention relates an emergency number notification system designed to automatically transmit detailed information about the particular registered phone line to an emergency number answering point. The detailed information is relayed from the emergency number answering point to an emergency number representative to provide the representative with detailed information allowing for better assistance to the caller. This invention also relates to an automatic notification system designed to notify predetermined contacts that an emergency number was dialed from a particular registered phone line.

BACKGROUND OF THE INVENTION

Emergency numbers are used throughout the world allowing a user to dial a specific number from any phone to connect to an emergency number answering point (e.g., 911 in the U.S., 000 in Australia, 112 in the European Community, and 999 in the U.K. and some Caribbean islands). When an emergency number is dialed the call is routed through a switching system to the appropriate emergency number answering point (e.g., Public Safety Answering Point ("PSAP") or Regional Public Safety Network ("RSPN")), where the call is answered. Each emergency number answering point typically covers one or more metropolitan areas or at least one rural county. At the emergency number answering point the call taker determines the nature of the call and, if necessary, contacts the appropriate personal. The call taker can typically contact police, fire or emergency medical personal. The area covered by a single emergency number answering point typically includes several independent police departments, fire departments, and medical responders.

In enhanced systems when an emergency number is dialed Automatic Number Identification (ANI) information is transmitted along with the voice information to the emergency number answering point. A device at the emergency number answering point uses the ANI information to look up the documented street address location from the Automatic Location Information (ALI) database. The street address is displayed on the call takers display when the street address location is available.

The street address location transmitted from the ALI database for calls placed through a private branch exchange (PBX) creates obstacles. When a call is placed through a PBX the emergency number answering point in most cases, only receives the demarcation address of the trunk installed for a particular PBX. Therefore, unless the caller informs the call taker that they are calling from a particular location the call taker would only be able to dispatch personal to the demarcation address of the trunk installed for that PBX, and not to the specific location of the telephone which was used to place the call. As a result, any dispatched personal risks arriving at an incorrect location, which could be detrimental to particular situations. A PBX may be used across multiple floors, campuses, or even multiple buildings that are miles apart. Some PBX providers allow users to input the physical location of their telephone lines.

When a call is made from a mobile telephone location information is more difficult to ascertain. As the phone is mobile the call may originate from a location distinct from the billing address. Therefore, additional methods are needed to determine the location of the call. In the U.S. new mobile phones are required to provide their latitude and longitude to the emergency number answering point in the event of an emergency number call. The mobile phone carriers may choose whether to implement transmit this data via GPS chips in each phone, or via triangulation between cell towers. Due to the limitations in technology of the mobile phones, cell phone towers, and emergency number answering point equipment, a mobile caller's geographical information may not always be available to the emergency number answering point.

Regardless of the type of phone that originates a call to an emergency number (residential, PBX line, mobile, or voice over internet protocol (hereinafter "IP")), at most only location information is displayed at the emergency number answering point. Furthermore, the current systems lack the ability to automatically notify predetermined contacts that an emergency number was initiated from a particular line.

U.S. Pat. No. 5,805,670 issued to Pons et al. on Sep. 8, 1998 is directed to a private notification system that provides detailed information about a subscriber to a private command center when a subscriber dials 9-1-1. The command center personnel can then contact those persons pre-selected by the subscriber of an emergency. The call center personal must physically notify those persons pre-selected by the subscriber after receiving notice that a subscriber dialed 9-1-1. This is inefficient as automated systems more effectively communicate notices. The private notification system can further provide detailed information about a particular subscriber. However, this is done though a private communication bridge requiring an additional connection and software at the emergency number answering point.

Therefore, automatic notification is desired. There is a need for an efficient means for automatically notifying predetermined persons that an emergency number has been dialed from a particular line.

Further, a device that can automatically transmit detailed information about the subscriber through existing systems is desired. There is a need to automatically provide additional information to an emergency number answering point without significantly modifying the existing systems.

SUMMARY OF THE INVENTION

The invention comprises, in one form thereof, an information transponding device in communication with an emergency number answering point, an ALI database and a remote storage device. The information transponding device receives ANI information from the emergency number answering point and accesses the corresponding information in the ALI database and the remote storage device. The information transponding device then merges the information into assimilated information and transmits to the emergency number answering point.

Additionally, the invention includes an automatic notification device to inform a predetermined list of persons that an emergency number was dialed from a particular line. The automatic notification device can be selected to generate a pre-recorded phone message, and e-mail, a text message or a page. The subscriber can update the list of predetermined persons through a Web portal and select the method or methods of contact.

In another form, the invention includes a system for allowing an authorized user to update the information that is transmitted to the emergency number answering point through a Web portal.

An advantage of the present invention is that the information transponding device can be installed with current systems without the need for additional connections or software at the emergency number answering point.

A further advantage of the present invention is that automatic notification can be sent to multiple persons in a variety of mediums.

An even further advantage of the present invention is that an authorized user can update the information that is transmitted to the emergency number answering point via a Web portal and secure connection on the World Wide Web.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
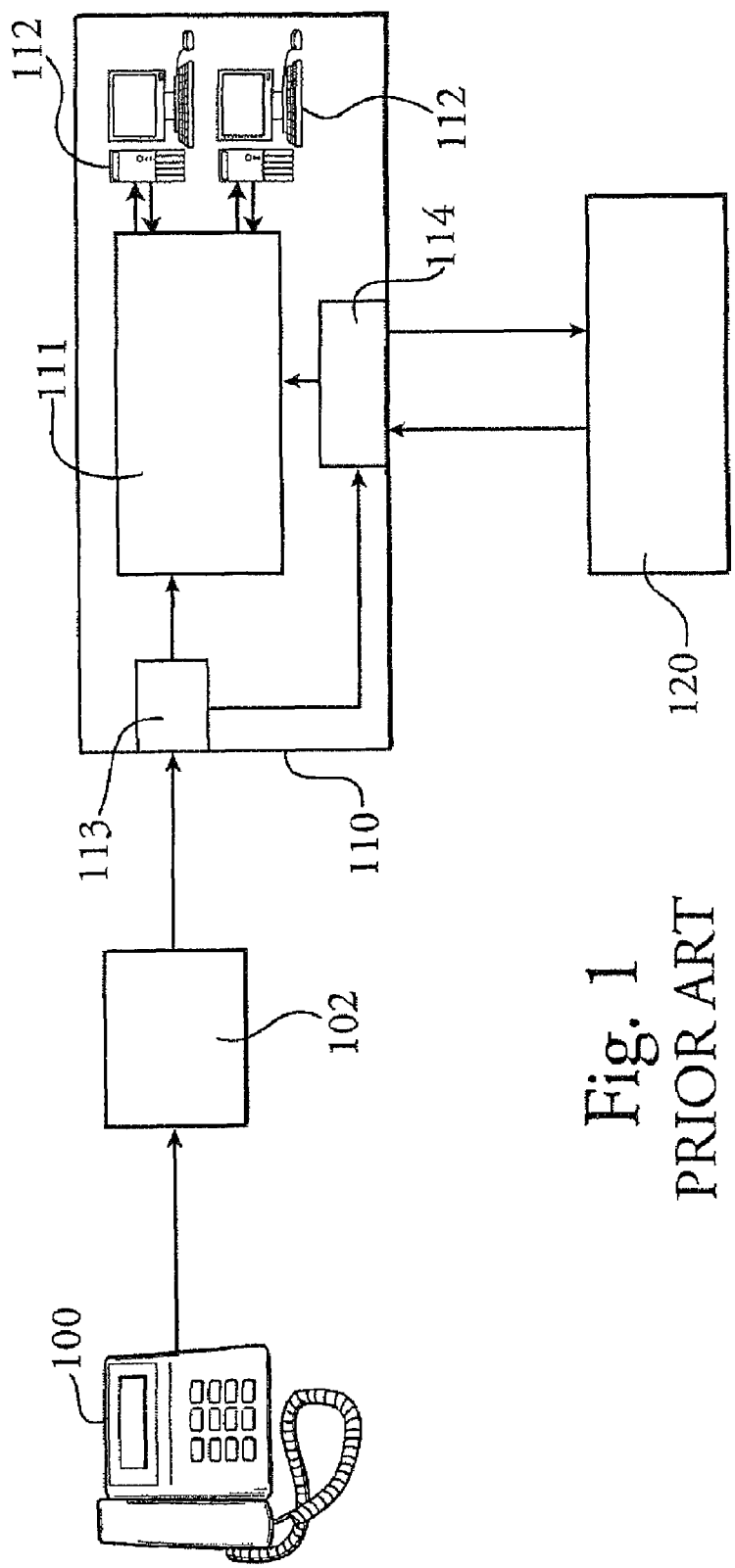
FIG. 1 illustrates a call to an emergency number as processed according to the prior art.

Referring to FIG. 1, there is shown an illustration of a call to an emergency number as processed according to the prior art. When an emergency number is dialed from a telephone 100 both voice and ANI information are transmitted to a switch 102 in communication with the telephone 100. The switch 102 routes the voice and ANI information to an appropriate emergency number answering point 110 based on the received ANI information.

Within the emergency number answering point 110 emergency number answering and routing equipment 113 divides the voice and ANI information. The emergency number answering and routing equipment 113 transmits the voice information to an emergency number controller 111 where it is stored in queue for the next available call-taker. Once a call-taker is available the emergency number controller 111 transmits the voice data to the call-taker work station 112.

The emergency number answering and routing equipment 113 transmits the ANI information to an emergency number data routing equipment 114. The emergency number data routing equipment 114 transmits the ANI information to the ALI database 120. The ALI database references the ANI information for the telephone 100 with the physical address location stored within the database for the received ANI information. The physical address location of the telephone 100 is transmitted from the ALI database 120 to the emergency number answering point 110. The emergency number data routing equipment 114 transmits this information to the emergency number controller 111. Once a call-taker is available the emergency number controller 111 transmits the line demarcation address location along with the voice data to the call-taker work station 112. If the voice data is previously transmitted the line demarcation address location is immediately transmitted to the appropriate call-taker workstation 112. The call-taker may then gather additional information from the caller and dispatch the appropriate services if necessary.

Figure 2:
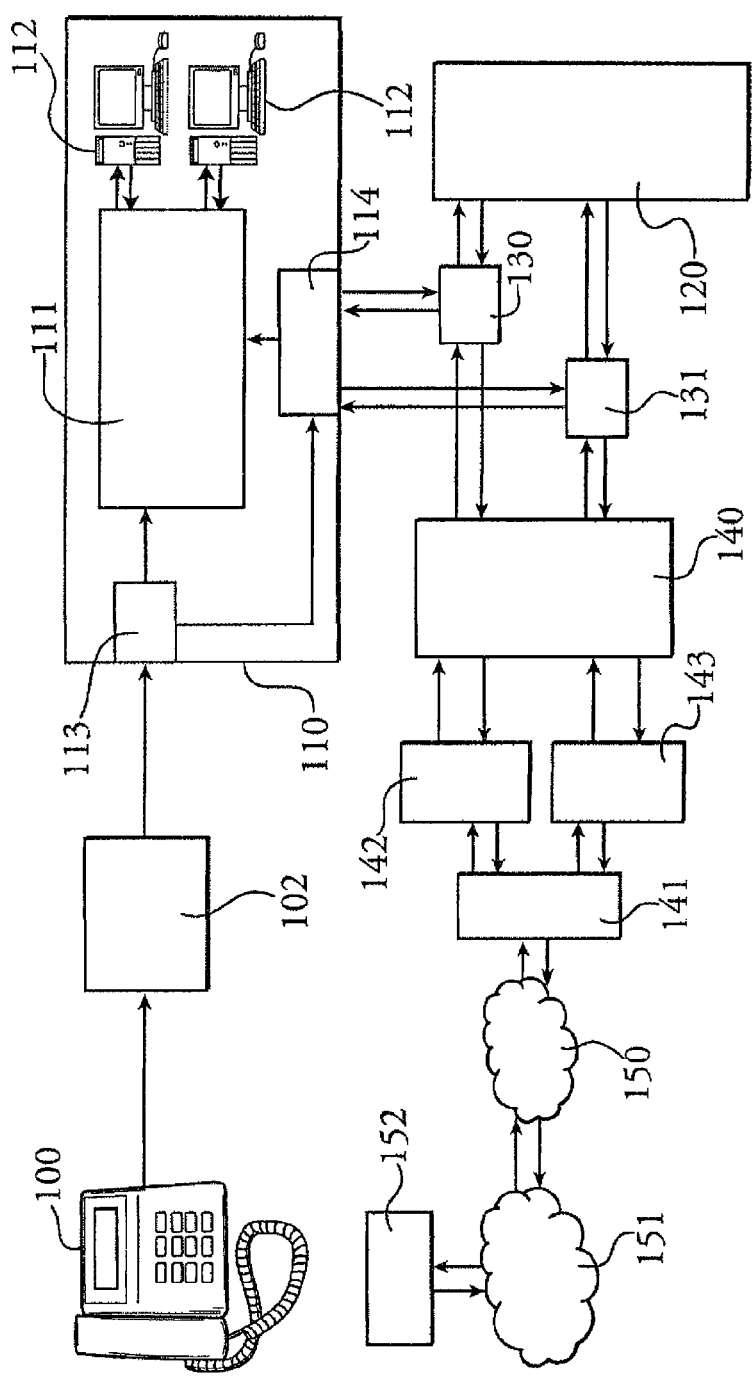
FIG. 2 illustrates a call to an emergency number as processed by a first embodiment of the present invention.

Referring to FIG. 2, there is shown an illustration of a call to an emergency number as processed according to a first embodiment of the present invention. As described in the prior art when an emergency number is dialed from a telephone 100 both voice and ANI information are transmitted to a switch 102 that routes the voice and ANI information to an appropriate emergency number answering point 110. Within the emergency number answering point 110 emergency number answering and routing equipment 113 divides the voice and ANI information. The emergency number answering and routing equipment 113 transmits the voice information to an emergency number controller 111 where it is stored in queue for the next available call-taker. Once a call-taker is available the emergency number controller 111 transmits the voice data to the call-taker work station 112. The emergency number answering and routing equipment 113 transmits the ANI information to an emergency number data routing equipment 114.

The emergency number data routing equipment 114 transmits the ANI information to a data transponding device 130. The data transponding device 130 transmits the ANI data to the ALI database 120. The ALI database 120 references the ANI information for the telephone 100 with the line demarcation address location stored within the database for the received ANI information. The line demarcation address location of the telephone 100 is transmitted from the ALI database 120 to the data transponding device 130.

The data transponding device 130 also transmits the ANI data to the detailed information storage device 140. The detailed information storage device 140 references the ANI information for the telephone 100 with the detailed information stored within the database for the received ANI information. The detailed information is transmitted from the detailed information storage device 140 to the data transponding device 130.

The detailed information can include but is not limited to actual phone location within a PBX (such as exact location, building, floor, and room number); structure information (such as class room, office building, warehouse, power plant, and floor plan layout); personal information (such as medical history, allergic reactions, current medications, and emergency contact information); or any special access requirements (such as keys, access codes, and building entry locations).

Figure 5:
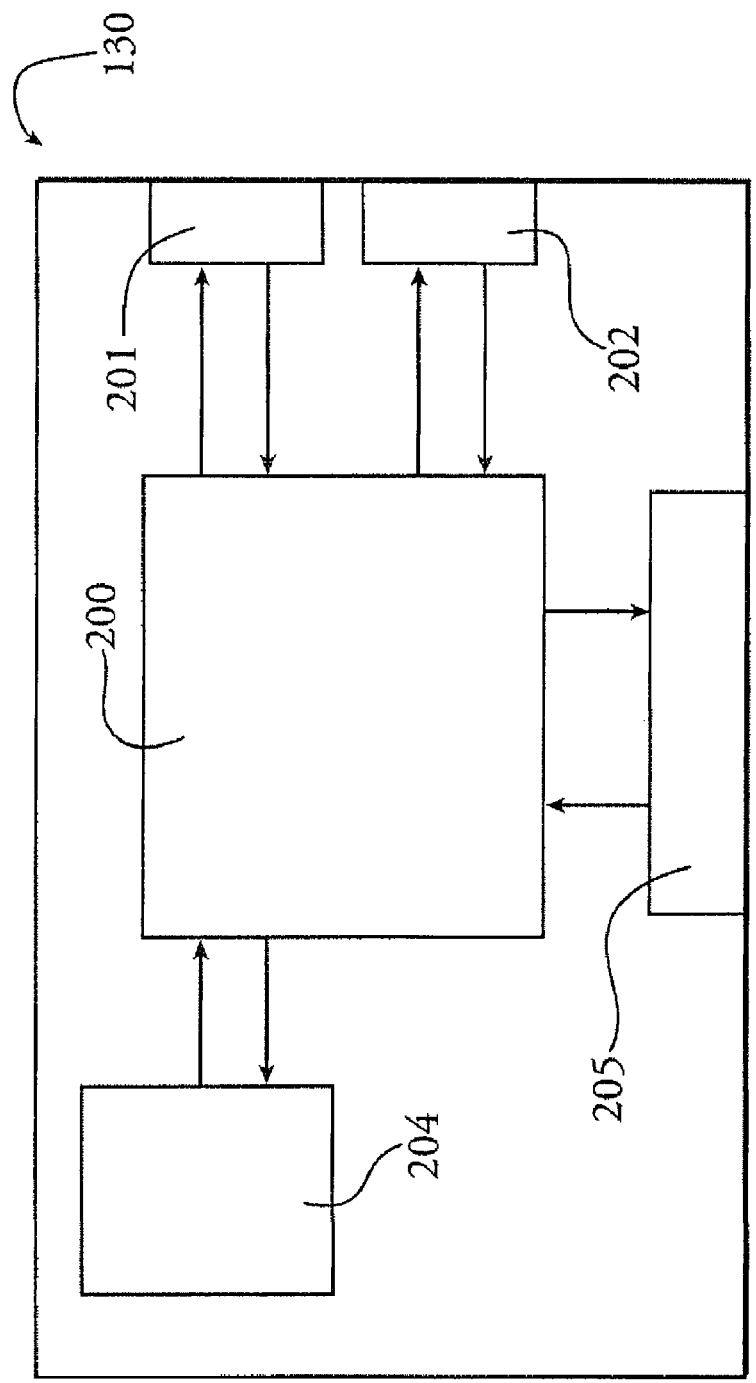
FIG. 5 is a schematic view of the data transponding device of the present invention.

Referring to FIG. 5, the information transponding device 130 receives ANI data through the emergency number answering port 201. A microprocessor 200 then relays the ANI data to the ALI database through the ALI database port 202, and to the detailed information storage device through the Ethernet port 205, to request information. A reference for the requests is stored in system memory 204. The system memory 204 may be flash memory, random access memory, or a combination thereof. If available at the detailed information storage device the detailed information is transmitted from the detailed information storage device back to the information transponding device through the Ethernet port 205 and stored in system memory 204. The ALI information is transmitted from the ALI database through the ALI database port 202 and a software program residing in the microprocessor merges the detailed information with the ALI information. This modified data is then transmitted to the emergency number answering point through the emergency number answering port 201. It is understood that the emergency number answering port 201, the ALI database port 202, and the Ethernet port 205 are capable of functioning as both an input and output port simultaneously.

It is understood that in the event of a delay in receiving either the ALI information or detailed information the information transponding device will transmit the non-delayed information to the emergency number answering point. In one embodiment the delayed information is stored in the system memory 204 for at least 5 minutes. The emergency number answering point may re-request information, and if available, the information transponding device resends the stored information.

The information transponding device 130 may also contain additional ports and voltage protected control lines. The ports may include digital inputs that connect directly to a plurality of control lines including, but not limited to, Carried Detect, Clear to Send, Request to Send, Data Set Ready, and Data Terminal Ready control lines to provide information status directly to the information transponding device. The ports may further include digital output lines converted to a proper voltage level that are used to originate the status of the control lines when needed. The digital inputs and outputs are connected to the information transponding device, through a self-healing connection. In the event that a cable becomes separated from the information transposing device the self-healing connection connects all necessary control lines and data signals such that the ANI and ALI signals will continue to work without interruption. Additional ports include analog converters to measure backup voltage, current, temperature and system status.

The information transponding device 130 may further comprise a watchdog timer to limit the amount of time the system is in an unknown state. If the system has a code failure such as a loop, stack over, or underrun the watchdog timer will reset the system with a cold boot. This allows for the system to run as intended without the need for a service tech to arrive on scene or access the device remotely. In one embodiment the watchdog timer resets the system if the system is in an unknown state for over 200 ms. In another embodiment the watchdog timer resets the system if the system is in an unknown state for over 62.5 ms.

The Ethernet port 205, in addition to providing a connection to the detailed information storage device may further provide a connection to LAN switches, the Internet, the main database interface ("MDI"), the secondary database interface ("SDI"), and other information transponding devices. The Ethernet port 205 provides a fast connection to the detailed information stored at the detailed information storage device. In one embodiment the information transponding device receives the detailed information, if available, prior to receiving the ALI information.

Referring again to FIG. 2, the information transponding device 130 transmits the modified data to the emergency number answering point 110. The emergency number data routing equipment 114 transmits this information to the emergency number controller 111. Once a call-taker is available the emergency number controller 111 transmits the physical address location along with the voice data to the call-taker workstation 112. If the voice data is previously transmitted the physical address location is immediately transmitted to the appropriate call-taker workstation 112. The call-taker may then gather additional information from the caller and dispatch the appropriate services if necessary. It is understood that the emergency number answering and routing equipment 113 and emergency number data routing equipment 114 may be multiple device or a single device capable of carrying out the required functions.

A tandem data transponding device 131 is communication with the emergency number answering point 110, the ALI database 120 and detailed information storage device 140. The tandem data transponding device 131 operates in the same manner as the data transponding device 130. The tandem data transponding device 131 is connected to other devices via lines that are distinct from those connecting the information transponding device 103. This ensures that the information will be transmitted even if one of the devices is inoperable or a transmission line is down.

The detailed information is modified and updated by an authorized user 152. The authorized user 152 connects to a Web portal 150 through the World Wide Web 151. The Web portal 150 connects to both the MDI 142 and the SDI 143 through a secure connection 141. The authorized user 152 inputs the detailed information and the MDI 142 and SDI 143 store the detailed information. The detailed information is then updated from the MDI 142 or SDI 143 to the detailed information storage device 140. The MDI 142 and SDI 143 are national databases which store information for every system user. In one embodiment the detailed information storage device 140 is a local device and stores only information for users in a regionalized area. The information transponding device 130 requests detailed information from the MDI 142 and the SDI 143 in the event that no results are returned from the detailed information storage device 140. It is understood that any number of database interfaces and storage device may be used.

The Web portal 150 provides a secure connection and personal access to the detailed information stored at the MDI 142 and the SDI 143. Web Access is provided by cluster Web servers located in a plurality of sites that all use the same domain name. Domain Name Servers (DNS) provide the routing to the Web servers. When an authorized users modifies the information both the MDI 142 and the SDI 143 servers are written to simultaneously through an IP connection. By simultaneously writing to a plurality of servers a secondary copy of the information is available in the event of a failure. The information is transmitted through the Web portal and is protected by Web secure certificates. The Web certificates provide a high level of encryption directly between the host Web site servers and the authorized user's web browser.

An authorized user may sign into the system on the Web portal by using a unique user name and password. A first time user will receive a message and will have to respond to the message to provide verification which will allow further access to the Web sites. Business and residential users will also have all numbers that they are entering (to add additional information) tested to verify that they indeed have authorization to modify the information relating to these numbers. With residential, cellular, personal communications services (hereinafter "PCS"), or voice over IP telephones the system will call out to these numbers and request a customer response to provide validity before the numbers may be placed in service.

When an authorized user enter the detailed information they additionally have the option of selecting notification options for when an emergency number is dialed from a particular telephone line. The authorized user can select a plurality of contacts to receive a notification message that an emergency number was dialed from that particular phone. The notification message may be, but is not limited to, an automatically generated pre-recorded phone call, a computer generated phone call, an E-mail, a text message, or a fax. The authorized user can modify what information is transmitted to each individual contact. The information can include all or part of the information that is sent to the emergency number answering point. The authorized user may further group telephone lines together such that when an emergency number is dialed from any one of those lines a particular contact will receive a notification message.

Figure 3:
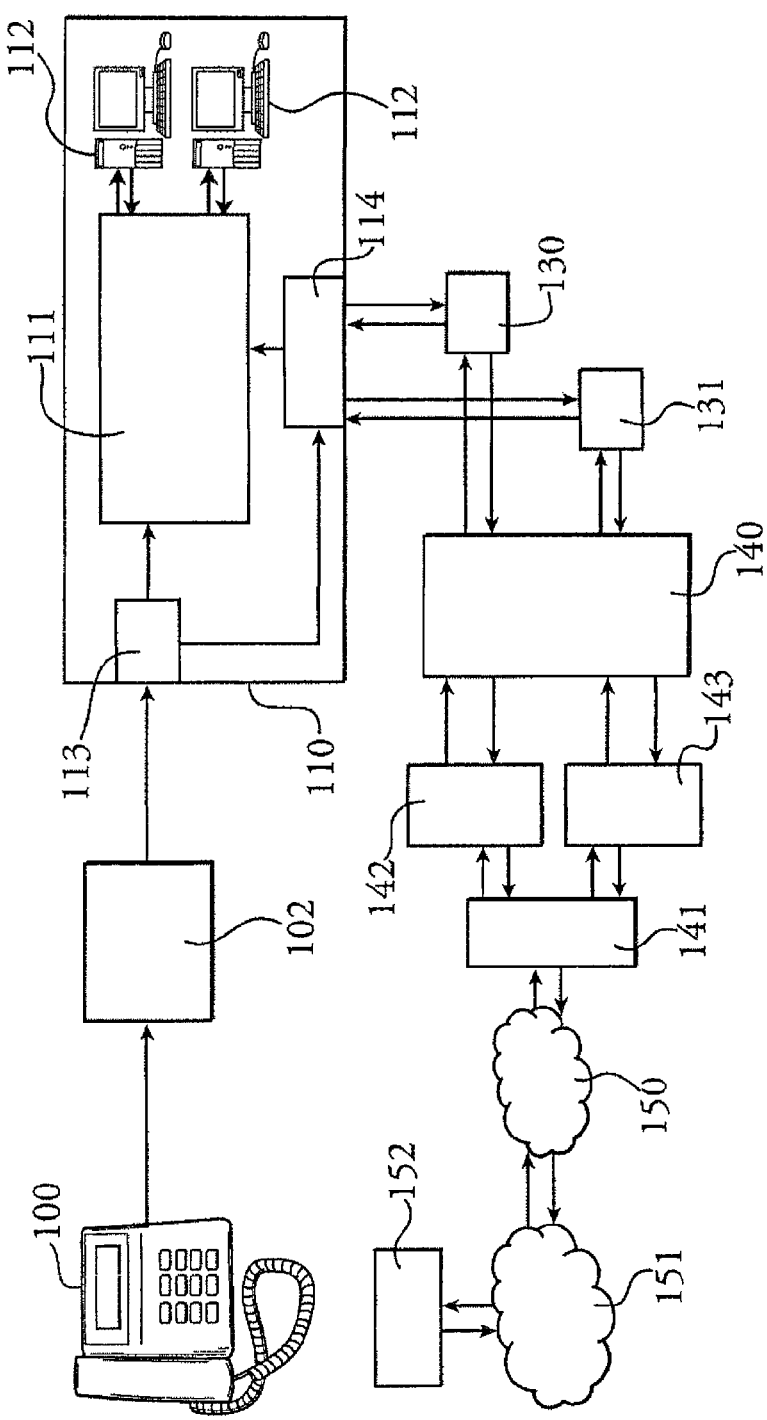
FIG. 3 illustrates a call to an emergency number as processed by a second embodiment of the present invention.

Referring to FIG. 3 there is shown an illustration of a call to an emergency number as processed according to a second embodiment of the present invention. As described in the first embodiment when an emergency number is dialed from a telephone 100 both voice and ANI information are transmitted to a switch 102 that routes the voice and ANI information to an appropriate emergency number answering point 110. Within the emergency number answering point 110 emergency number answering and routing equipment 113 divides the voice and ANI information. The emergency number answering and routing equipment 113 transmits the voice information to an emergency number controller 111 where it is stored in queue for the next available call-taker. Once a call-taker is available the emergency number controller 111 transmits the voice data to the call-taker work station 112. The emergency number answering and routing equipment 113 transmits the ANI information to an emergency number data routing equipment 114.

The emergency number data routing equipment 114 transmits the ANI information to a data transponding device 130. The data transponding device 130 transmits the ANI data to the detailed information storage device 140. The detailed information storage device 140 references the ANI information for the telephone 100 with the detailed information stored within the database for the received ANI information. The detailed information is transmitted from the detailed information storage device 140 to the data transponding device 130. The physical location information is provided directly from the detailed information storage device 140 without the need for accessing the ALI database (FIG. 2).

The detailed information can include but is not limited to actual phone location within a PBX (such as exact location, building, floor, and room number); structure information (such as class room, office building, warehouse, power plant, and floor plan layout); personal information (such as medical history, allergic reactions, current medications, and emergency contact information); or any special access requirements (such as keys, access codes, and building entry locations).

Referring to FIG. 5, the information transponding device 130 receives ANI data through the emergency number answering port 201. A microprocessor 200 then relays the ANI data to the to the detailed information storage device through the Ethernet port 205 to request information. A reference for the requests is stored in system memory 204. The system memory 204 may be flash memory, random access memory, or a combination thereof. If available at the detailed information storage device the detailed information is transmitted from the detailed information storage device back to the information transponding device through the Ethernet port 205 and then transmitted to the emergency number answering point.

The information transponding device 130 may also contain additional ports and voltage protected control lines. The ports may include digital inputs that connect directly to a plurality of control lines including, but not limited to, Carried Detect, Clear to Send, Request to Send, Data Set Ready, and Data Terminal Ready control lines to provide information status directly to the information transponding device. The ports may further include digital output lines converted to a proper voltage level that are used to originate the status of the control lines when needed. The digital inputs and outputs are connected to the information transponding device through a self-healing connection. In the event that a cable becomes separated from the information transposing device the self-healing connection connects all necessary control lines and data signals such that the ANI and ALI signals will continue to work without interruption. Additional ports include analog converters to measure backup voltage, current, temperature, and system status.

The information transponding device 130 may further comprise a watchdog timer to limit the amount of time the system is in an unknown state. If the system has a code failure such as a loop, stack over or underrun the watchdog timer will reset the system with a cold boot. This allows for the system to run as intended without the need for a service tech to arrive on scene or access the device remotely. In one embodiment the watchdog timer resets the system if the system is in an unknown state for over 200 ms. In another embodiment the watchdog timer resets the system if the system is in an unknown state for over 62.5 ms.

The Ethernet port 205, in addition to providing a connection to the detailed information storage device may further provide a connection to LAN switches, the Internet, the main database interface ("MDI"), the secondary database interface ("SDI"), and other information transponding devices. The Ethernet port 205 provides a fast connection to the detailed information stored at the detailed information storage device.

Referring again to FIG. 3, the information transponding device 130 transmits the modified data to the emergency number answering point 110. The emergency number data routing equipment 114 transmits this information to the emergency number controller 111. Once a call-taker is available the emergency number controller 111 transmits the line demarcation location along with the voice data to the call-taker work station 112. If the voice data is previously transmitted the line demarcation location is immediately transmitted to the appropriate call-taker workstation 112. The call-taker may then gather additional information from the caller and dispatch the appropriate services if necessary. It is understood that the emergency number answering and routing equipment 113 and emergency number data routing equipment 114 may be multiple devices or a single device capable of carrying out the required functions.

A tandem data transponding device 131 is communication with the emergency number answering point 110, the ALI database 120 and detailed information storage device 140. The tandem data transponding device 131 operates in the same manner as the data transponding device 130. The tandem data transponding device 131 is connected to other devices via lines that are distinct from those connect the information transponding device 103. This ensures that the information will be transmitted even if one of the devices is inoperable or a transmission line is down.

The detailed information is modified and updated by an authorized user 152. The authorized user 152 connects to a Web portal 150 through the World Wide Web 151 as set forth in the first embodiment.

Figure 4:
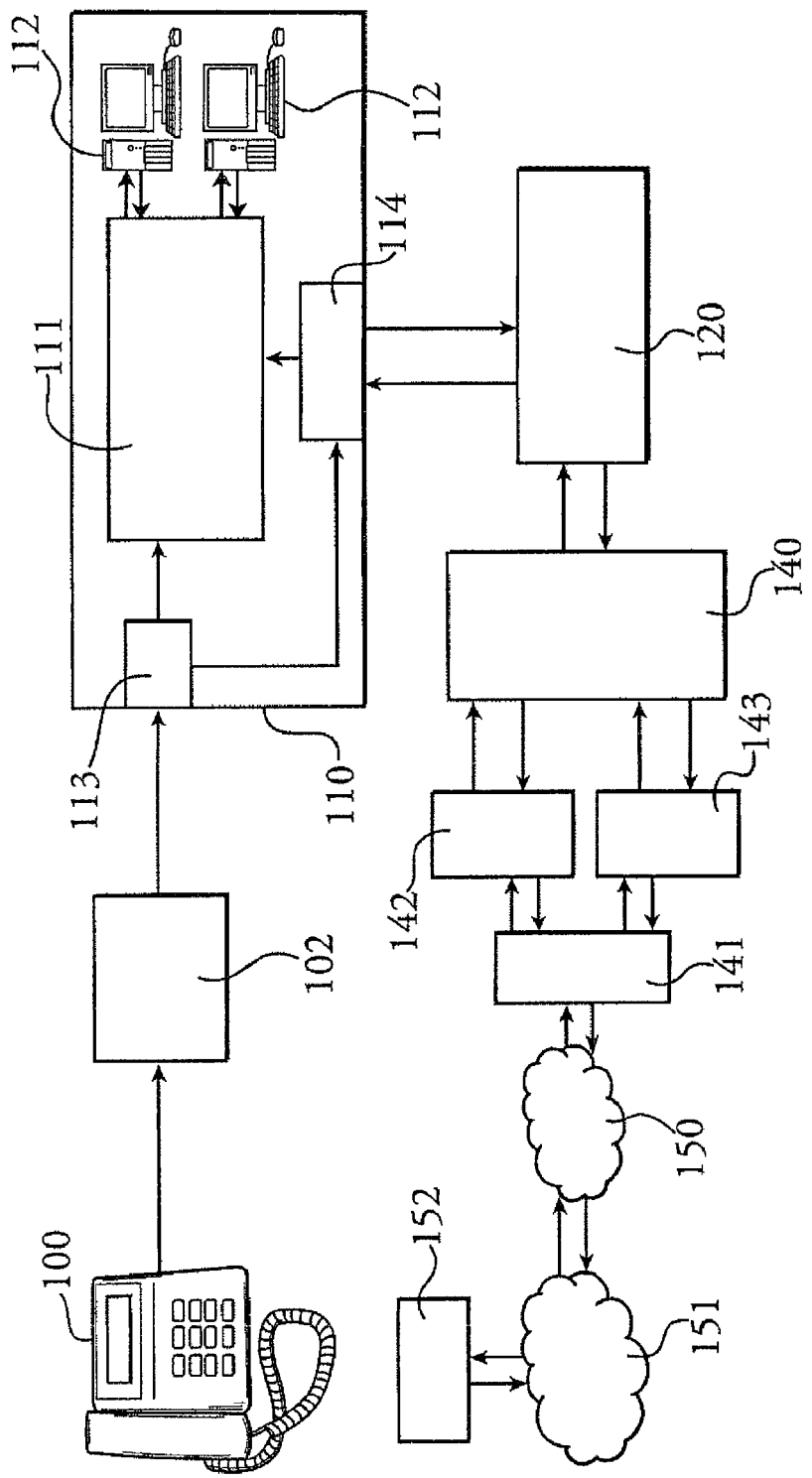
FIG. 4 illustrates a call to an emergency number as processed by a third embodiment of the present invention.

Referring to FIG. 4, there is shown an illustration of a call to an emergency number as processed according to a third embodiment of the present invention. As described in the first embodiment when an emergency number is dialed from a telephone 100 both voice and ANI information are transmitted to a switch 102 that routes the voice and ANI information to an appropriate emergency number answering point 110. Within the emergency number answering point 110 emergency number answering and routing equipment 113 divides the voice and ANI information. The emergency number answering and routing equipment 113 transmits the voice information to an emergency number controller 111 where it is stored in queue for the next available call-taker. Once a call-taker is available the emergency number controller 111 transmits the voice data to the call-taker work station 112. The emergency number answering and routing equipment 113 transmits the ANI information to an emergency number data routing equipment 114.

The emergency number data routing equipment 114 transmits the ANI information to an ALI database 120. The ALI database 120 is connected to the detailed information storage device 140. The ALI database 120 accesses both the line demarcation address location and the detailed information stored in the detailed information storage device 140. The detailed information is merged with the ALI information and transmitted to the emergency number data routing equipment 114. It is understood that both the ALI information and detailed information may be stored in the same device and may be merged prior to receiving any ANI information from an emergency number answering point 110.

The detailed information is modified and updated by an authorized user 152. The authorized user 152 connects to a Web portal 150 through the World Wide Web 151 as set forth in the first embodiment.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for processing an emergency call, the method comprising the steps of:
receiving, at a switch, voice information and Automatic Number Identification (ANI) information associated with a telephone;
routing, with the switch, the voice information and ANI information to an emergency number answering point;
dividing the voice information from the ANI information;
transmitting the voice information to a emergency number controller;
transmitting the ANI information to a transponding device;
referencing, with the transponding device, an Automatic Location Information (ALI) database to retrieve ALI information associated with the telephone;
referencing, with the transponding device, a detailed information storage device to retrieve detailed information associated with the telephone;
merging the ALI information with the detailed information to produce modified data;
transmitting the modified data from the transponding device to the emergency number answering point; and
experiencing a delay receiving either the ALI information or the detailed information;
transmitting non-delayed information;
subsequently receiving delayed information;
storing the delayed information in a memory of the transponding device for a predetermined period of time;
transmitting the stored, delayed information to the emergency number answering point.

2. The method of claim 1, wherein the emergency number answering point utilizes a first software, the method further comprising the step of converting the modified information into a form readable by the first software, the step of converting being performed prior to the step of transmitting the modified data.

3. The method of claim 1, wherein the detailed information includes a predetermined list of contacts, the method further comprising the step of transmitting automatic notifications to the predetermined list of contacts.

4. The method of claim 3, wherein said automatic notifications are selected from the group consisting essentially of: a prerecorded phone message to a phone line, an electronic mailing to an e-mail address, a page to a pager, a text message to a mobile phone, an instant message to an instant messaging device, a fax to a facsimile device, and any combination thereof.

5. The method of claim 1, further comprising the step of updating the detailed information, the step being performed by an authorized user via a secure Web portal on the World Wide Web.

6. The method of claim 1, wherein the telephone is part of a private branch exchange (PBX) and the detailed information the specific location of the telephone within the PBX.

7. The method of claim 1, wherein the transponding device is connected to the emergency number answering point and the ALI database via a phone line.

8. A method for processing an emergency call, the method comprising the steps of:
receiving, at a switch, voice information and Automatic Number Identification (ANI) information associated with a telephone;
routing, with the switch, the voice information and ANI information to an emergency number answering point;
dividing the voice information from the ANI information;
transmitting the voice information to a emergency number controller;
transmitting the ANI information to a transponding device;
referencing, with the transponding device, an Automatic Location Information (ALI) database to retrieve ALI information associated with the telephone;
referencing, with the transponding device, a detailed information storage device to retrieve detailed information associated with the telephone;
merging the ALI information with the detailed information to produce modified data;
transmitting the modified data from the transponding device to the emergency number answering point;
displaying the modified data at a work station, including both the ALI information and the detailed information; and
experiencing a delay receiving either the ALI information or the detailed information;
transmitting non-delayed information;
subsequently receiving delayed information;
storing the delayed information in a memory of the transponding device for a predetermined period of time;
transmitting the stored, delayed information to the emergency number answering point.

9. The method as recited in claim 8, further comprising the step of transmitting the ANI information to a tandem data transponding device which functions as a backup for the transponding device.

10. The method of claim 8, wherein the step of transmitting the stored, delayed information is performed upon request of the emergency number answering point.

11. The method of claim 9, further comprising the step of updating the detailed information, the step being performed by an authorized user via a secure Web portal on the World Wide Web.

12. The method of claim 9, further comprising the step of signing on to the secured Web portal with a user name and password to access the detailed information prior to the step of updating the detailed information.

13. The method of claim 9, wherein the ALI information is displayed at the work station only after it has been merged with the detailed information.

14. The method of claim 9, wherein the emergency number answering point utilizes a first software, the method further comprising the step of converting the modified information into a form readable by the first software, the step of converting being performed prior to the step of transmitting the modified data.

15. The method of claim 14, wherein the step of converting is performed by the transponding device.

* * * * *